US011068573B2

(12) United States Patent
Ogawa

(10) Patent No.: US 11,068,573 B2
(45) Date of Patent: Jul. 20, 2021

(54) ELECTRONIC DEVICE AND METHOD OF STARTING ELECTRONIC DEVICE

(71) Applicant: Toshiba Client Solutions CO., LTD., Tokyo (JP)

(72) Inventor: Takehiro Ogawa, Kanagawa (JP)

(73) Assignee: Toshiba Client Solutions CO., LTD, Tokyo (JP)

( * ) Notice: Subject to any disclaimer, the term of this patent is extended or adjusted under 35 U.S.C. 154(b) by 252 days.

(21) Appl. No.: 16/042,508

(22) Filed: Jul. 23, 2018

(65) Prior Publication Data

US 2019/0236256 A1 Aug. 1, 2019

(30) Foreign Application Priority Data

Jan. 31, 2018 (JP) ............................ JP2018-015903

(51) Int. Cl.
*G06F 21/34* (2013.01)
*G06F 21/44* (2013.01)

(52) U.S. Cl.
CPC .............. *G06F 21/34* (2013.01); *G06F 21/44* (2013.01); *G06F 2221/2129* (2013.01)

(58) Field of Classification Search
CPC ... G06F 21/34; G06F 21/44; G06F 2221/2129
See application file for complete search history.

(56) References Cited

U.S. PATENT DOCUMENTS

| | | | | |
|---|---|---|---|---|
| 5,207,426 A * | 5/1993 | Inoue | A63F 13/06 | 463/36 |
| 8,081,526 B1 * | 12/2011 | Westbrook | G11C 8/10 | 365/189.05 |
| 9,626,183 B1 * | 4/2017 | Smith | G06F 9/44542 | |
| 2002/0013023 A1 * | 1/2002 | Kubota | G06F 1/266 | 438/200 |
| 2003/0024976 A1 * | 2/2003 | Komurasaki | B60R 25/24 | 235/375 |
| 2004/0044903 A1 * | 3/2004 | Komatsu | G06F 21/70 | 726/35 |
| 2005/0010784 A1 * | 1/2005 | Ito | G06F 21/34 | 713/182 |
| 2010/0161772 A1 * | 6/2010 | Nakamura | G06F 11/3013 | 709/221 |
| 2011/0063094 A1 * | 3/2011 | Meiertoberens | A61M 5/14244 | 340/12.5 |
| 2011/0283053 A1 * | 11/2011 | Yamashita | G06F 16/1847 | 711/103 |
| 2015/0161371 A1 * | 6/2015 | Hoshi | G06F 21/35 | 726/19 |
| 2016/0127815 A1 * | 5/2016 | Ookuri | H04R 1/06 | 381/119 |

(Continued)

FOREIGN PATENT DOCUMENTS

| | | |
|---|---|---|
| JP | 2009-187154 A | 8/2009 |
| WO | WO 03/071403 A1 | 8/2003 |

*Primary Examiner* — J. Brant Murphy
(74) *Attorney, Agent, or Firm* — Knobbe, Martens, Olson & Bear, LLP

(57) ABSTRACT

According to one embodiment, an electronic device is connectable to other devices. Starting of the electronic device is enabled when the electronic device is connected to a specified device among the other devices, and starting of the electronic device is disabled when the electronic device is not connected to the specified device.

11 Claims, 12 Drawing Sheets

(56) References Cited

U.S. PATENT DOCUMENTS

| | | | | |
|---|---|---|---|---|
| 2017/0011210 | A1* | 1/2017 | Cheong | G06F 21/32 |
| 2017/0301205 | A1* | 10/2017 | Blaser | G08B 13/1454 |
| 2017/0364713 | A1* | 12/2017 | Speak | G06F 21/85 |
| 2018/0041075 | A1* | 2/2018 | Kaechi | H02J 7/025 |
| 2018/0123804 | A1* | 5/2018 | Smith | H04L 9/30 |
| 2018/0329659 | A1* | 11/2018 | Matsui | G06F 3/1231 |
| 2019/0228192 | A1* | 7/2019 | Morimoto | G06K 7/10297 |

* cited by examiner

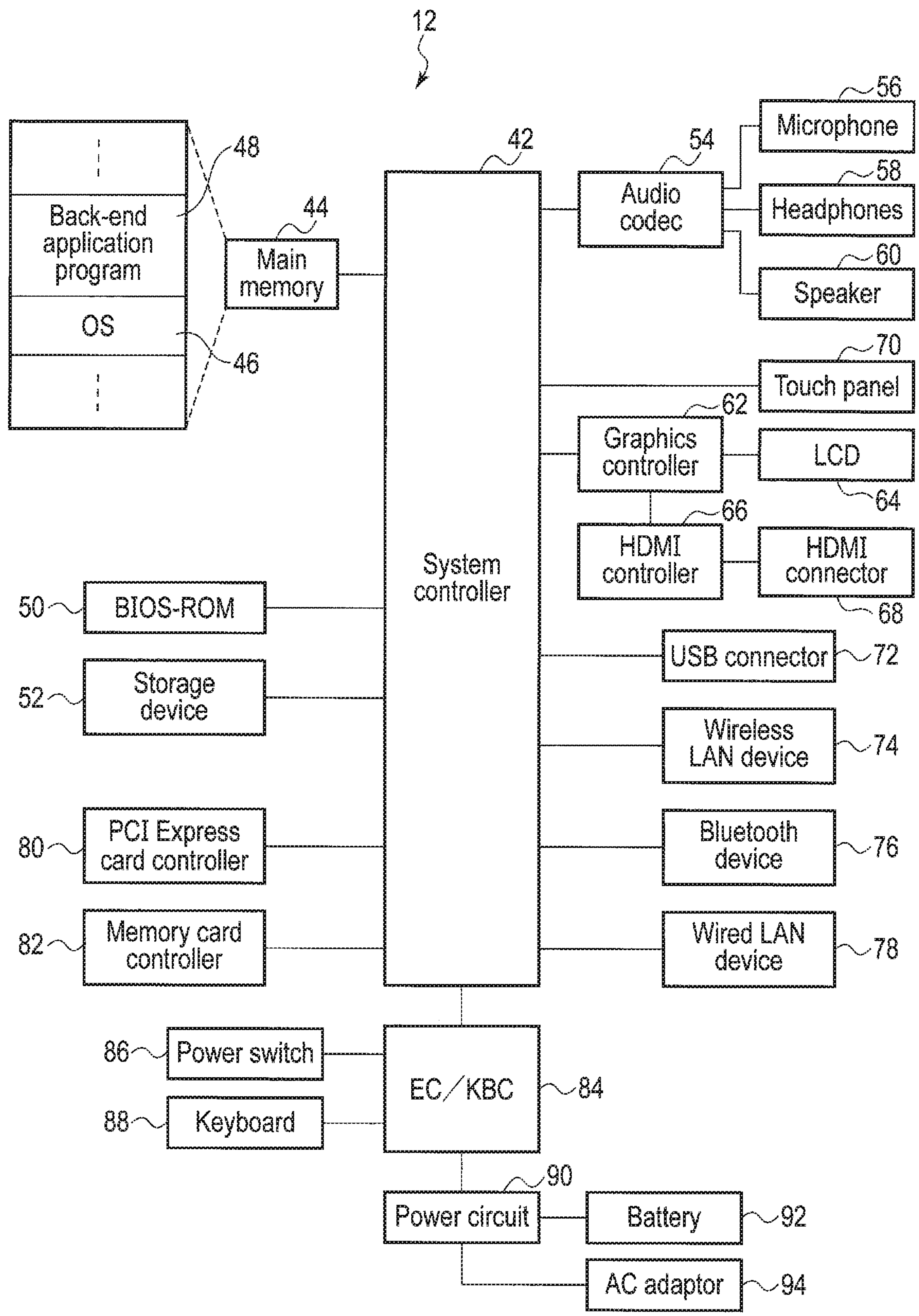
F I G. 2

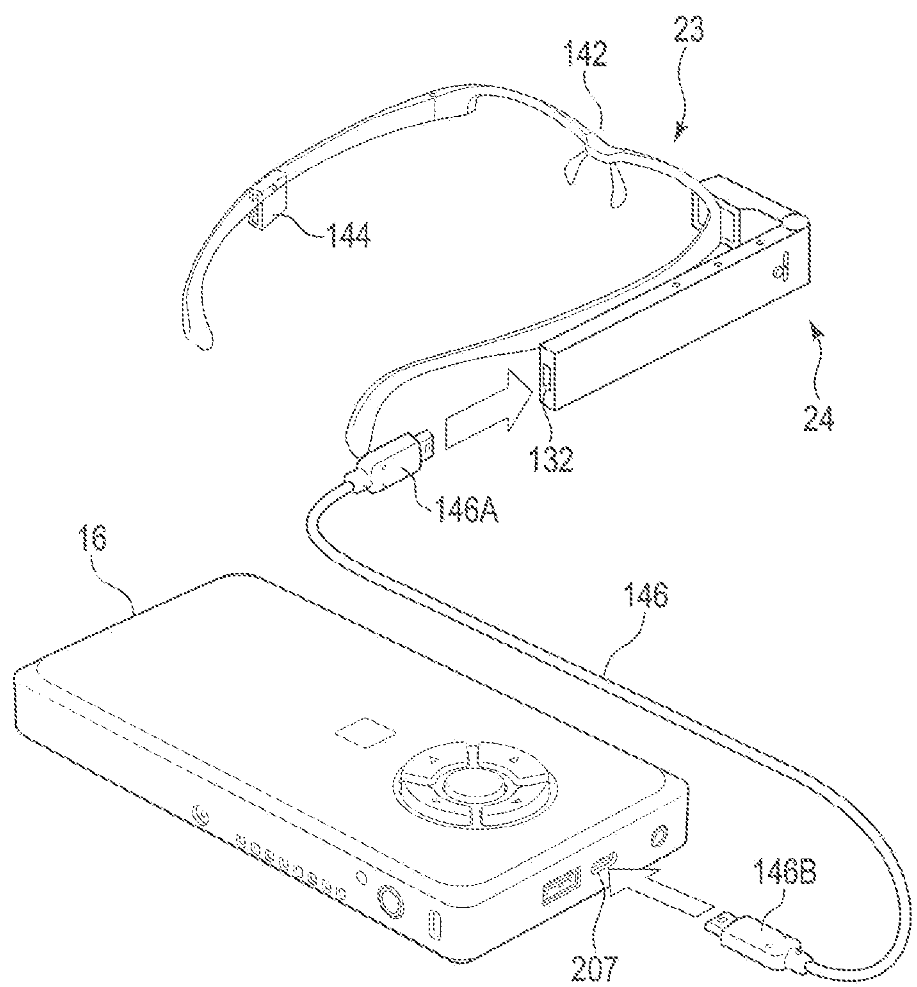
F I G. 5

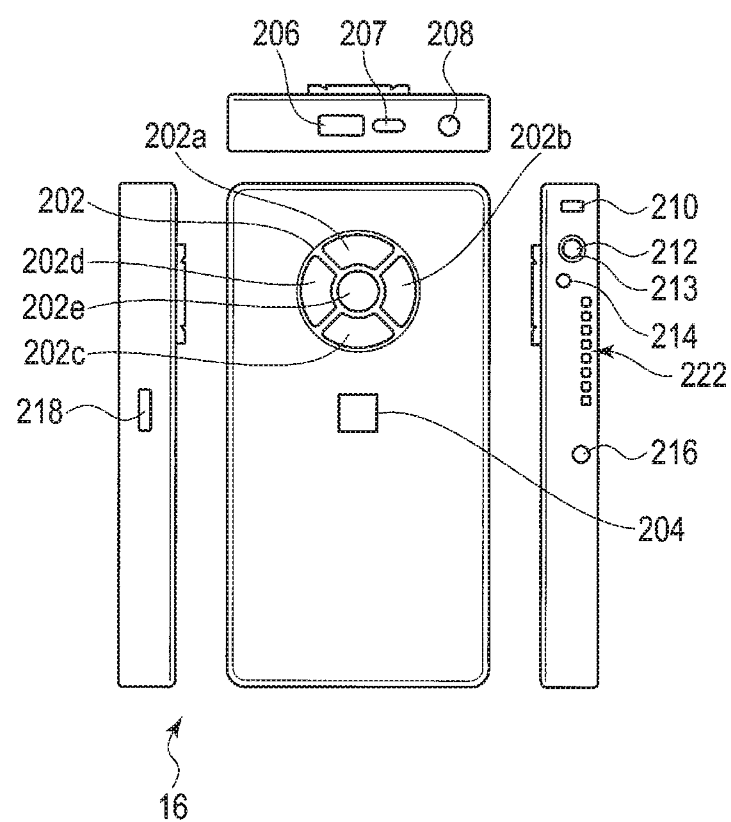
F I G. 7

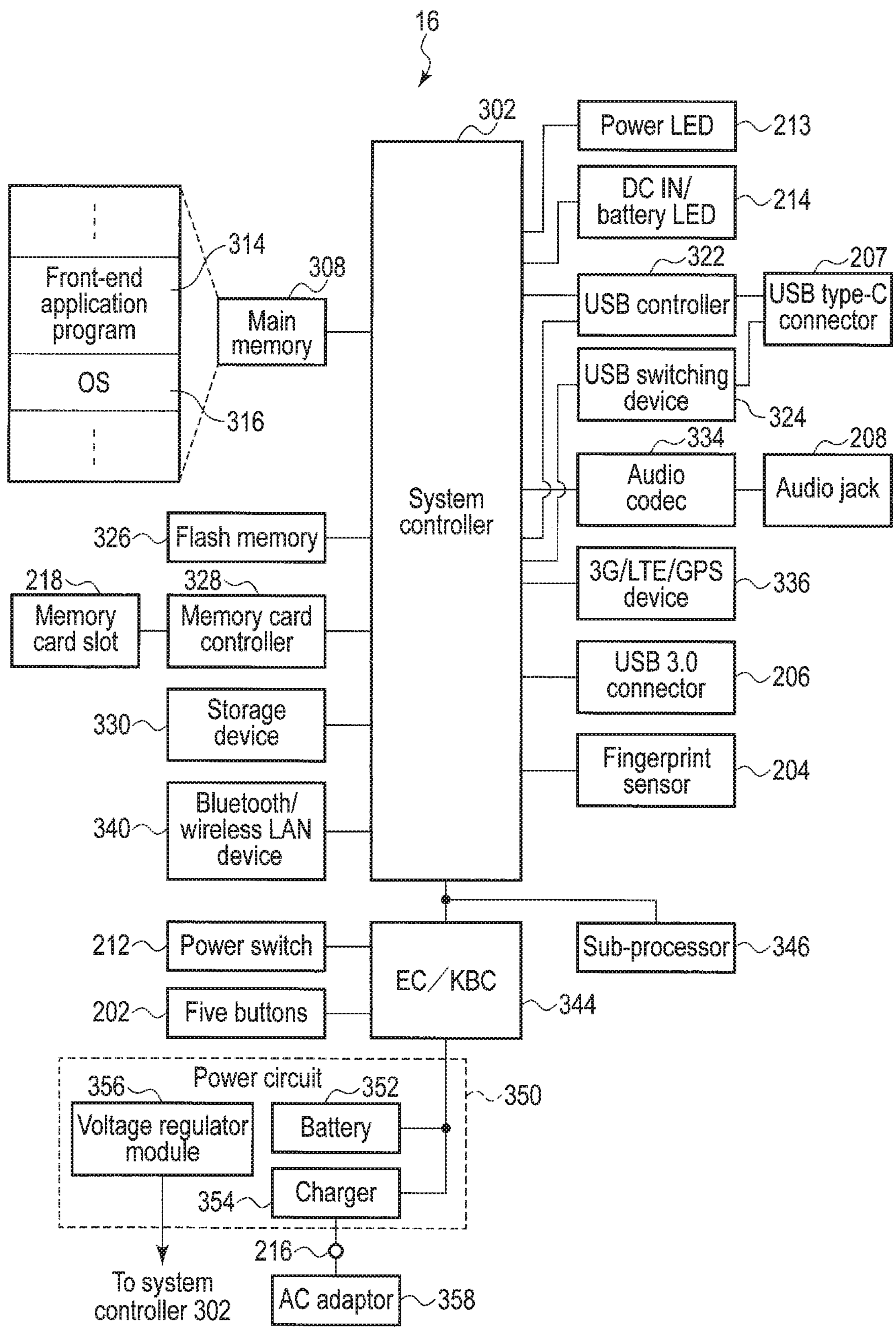
F I G. 8

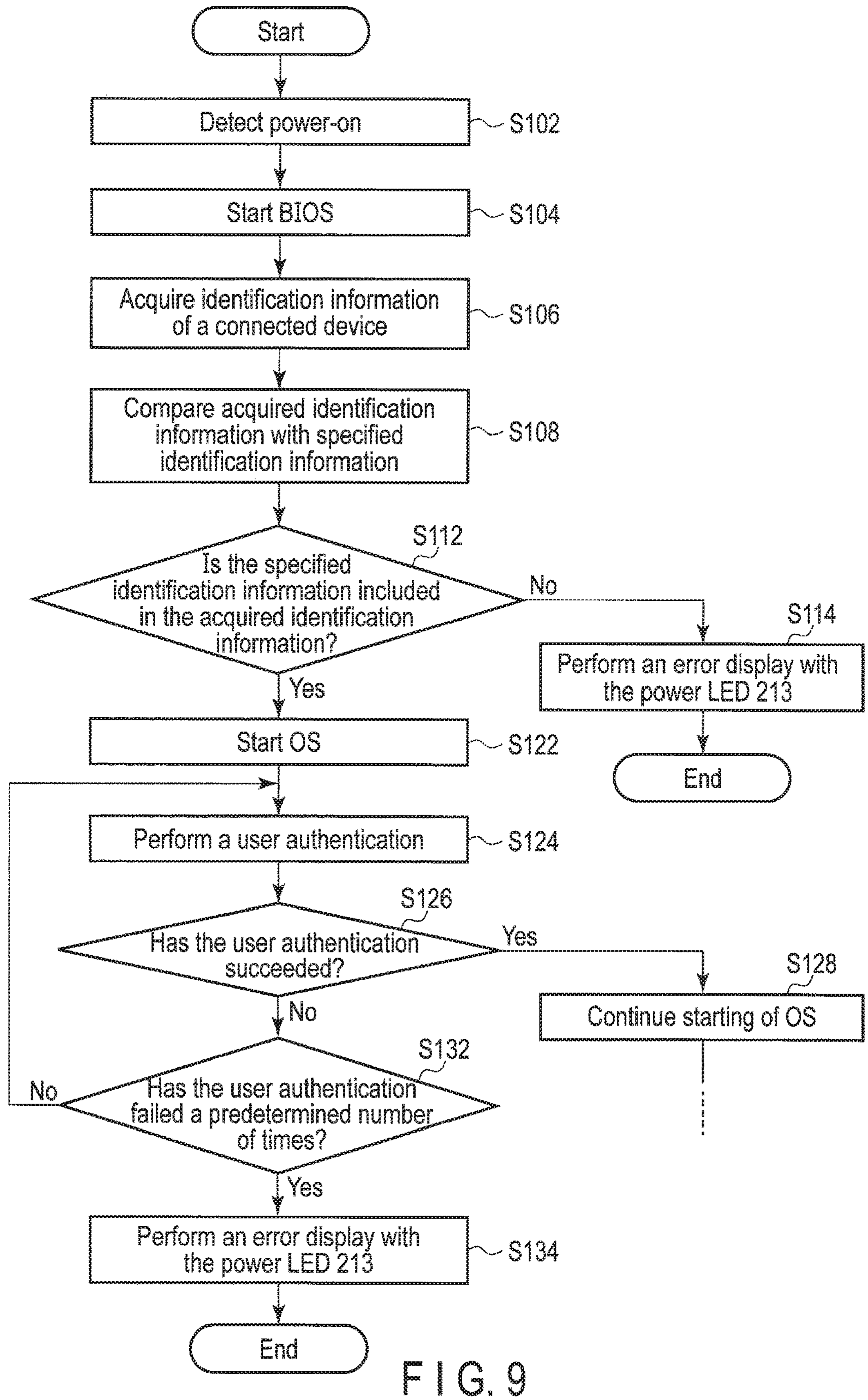
F I G. 9

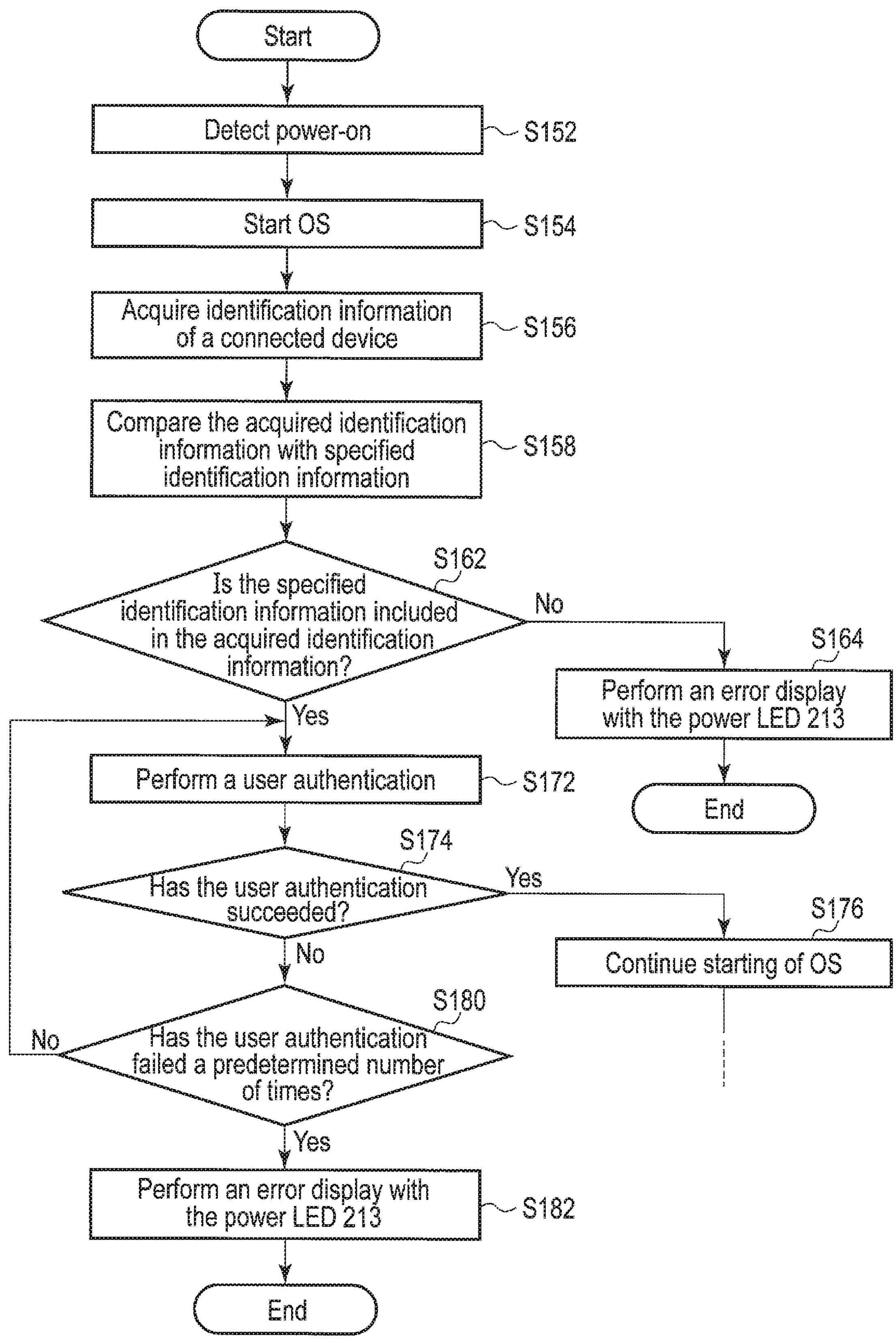
F I G. 11

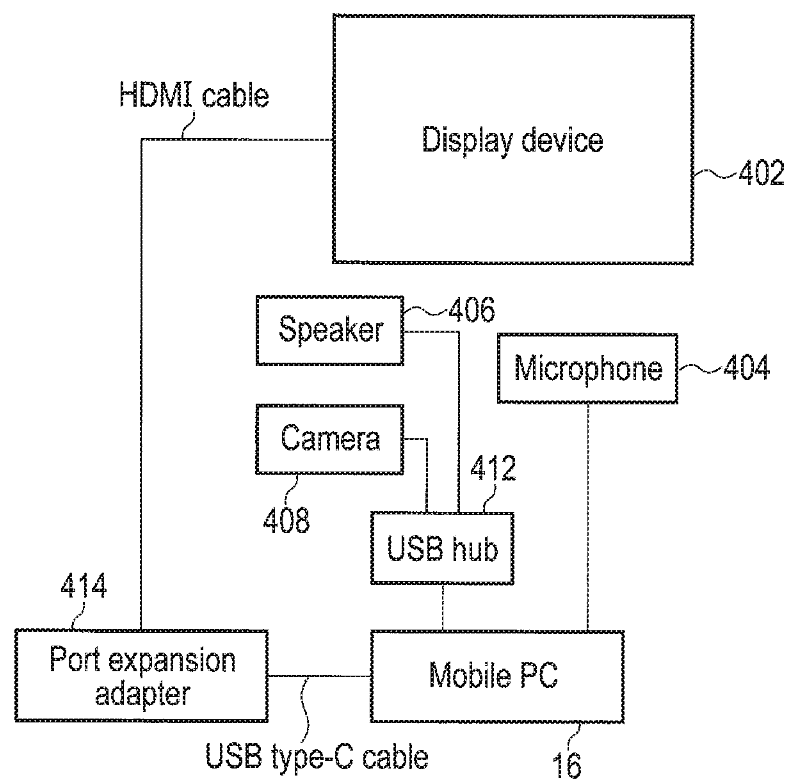
F I G. 12

ELECTRONIC DEVICE AND METHOD OF STARTING ELECTRONIC DEVICE

CROSS-REFERENCE TO RELATED APPLICATIONS

This application is based upon and claims the benefit of priority from Japanese Patent Application No. 2018-015903, filed Jan. 31, 2018, the entire contents of which are incorporated herein by reference.

FIELD

Embodiments described herein relate generally to an electronic device and a method of starting an electronic device.

BACKGROUND

Recently, an IoT (Internet of Things) age in which many things are connected through the Internet has come. A technique called "edge computing" is required as a tool for network communication and information sharing in offices, factories, and in other various situations. In order to realize the edge computing, development of a practical mobile edge computing device having high degrees of versatility and high processing capacity, and able to be used by a worker (also called user) on site, is needed separately from a data center (or cloud). Thereby, it is expected that promotion of the operational efficiency and productivity improvement at a workplace and the like, or load dispersion of data and improvement of a network environment will be achieved.

In order to make the mobile edge computing device small-sized and lightweight, the device is provided with a processor but is not provided with a display device and an input device such as a hardware keyboard and a mouse. The mobile edge computing device is connected to an external display device or an external input device if necessary.

The mobile edge computing device is supposed to be used in a specific environment such as a workplace. However, the device can be taken out from the specific environment because the device is small in size and light in weight and is used in other environments. For example, the mobile edge computing device can be taken out from the office and used at home for personal purposes in an unauthorized manner.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an exemplary structure of an operator terminal 12 in FIG. 1.

FIG. 5 is a view showing an example of connection between the mobile PC 16 and the wearable device main body 24.

FIG. 7 is a view showing an example of an external appearance of the mobile PC 16.

FIG. 8 is a block diagram showing an exemplary structure of the mobile PC 16.

FIG. 9 is a flowchart illustrating an example of processing of the system controller 302 regarding starting of the mobile PC 16.

FIG. 11 is a flowchart illustrating another example of the processing of the system controller 302 regarding starting of the mobile PC 16.

FIG. 12 illustrates an example of a video conference system including the mobile PC 16.

DETAILED DESCRIPTION

Figure 1:
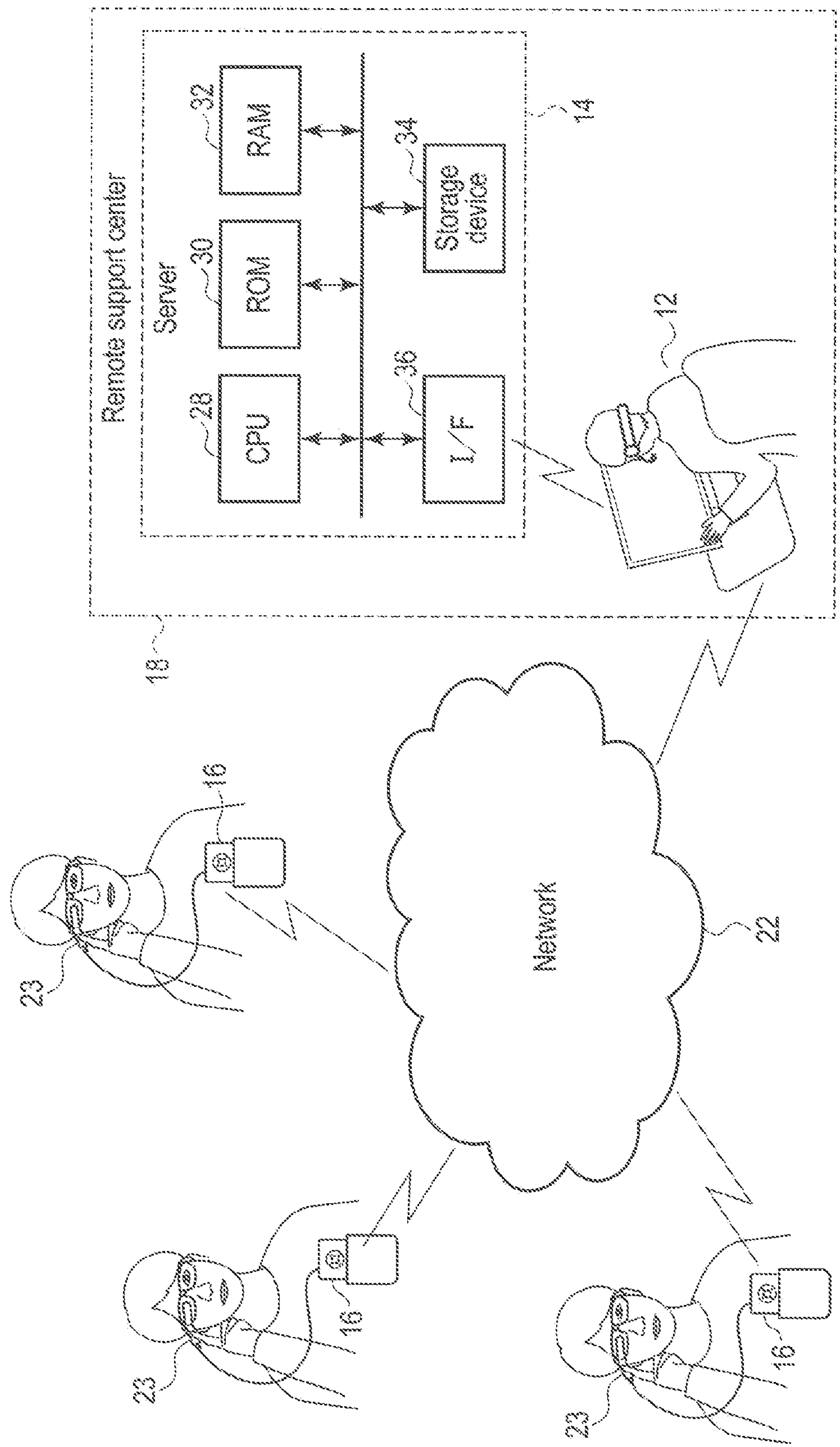
FIG. 1 is a block diagram showing an example of a remote support system including an electronic device of an embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, an electronic device is connectable to other devices. Starting of the electronic device is enabled when the electronic device is connected to a specified device among the other devices. Starting of the electronic device is disabled when the electronic device is not connected to the specified device.

[Remote Support System]

FIG. 1 is a block diagram showing an example of a remote support system which realizes edge computing. The remote support system is used by an operator at the rear to support a user, for example, a user at a workplace from a remote place. Examples of work at the workplace include a complicated maintenance service, picking operation in a distribution warehouse, monitoring of a workplace, disaster relief/medical support, and the like. The user side of the workplace is also called a front end, and the operator side at the rear is also called a back end. In the remote support system, a mobile personal computer (PC) (also called a mobile edge computing device in some cases) 16 carried by the user and remote support center (or data center) 18 located at a position distant from the user are connected to each other through a network 22, such as the Internet, so that communication can be carried out between them. The mobile PC 16 and remote support center 18 may be connected to the network 22 through wired LAN cables or may be connected to the network 22 through a wireless LAN, Bluetooth (registered trade mark), and the like.

A wearable device 23 is connected to the mobile PC 16. Although FIG. 1 shows an example in which the wearable device 23 is connected to the mobile PC through a cable, the wearable device 23 may also be connected to the mobile PC 16 through a wireless LAN, Bluetooth or the like. The wearable device 23 is provided with a camera and display device. An image shot by the camera may be transmitted to the mobile PC 16, and the image transmitted from the mobile PC 16 may be displayed on the display device.

As shown in FIG. 1, it is also possible for a plurality of users to communicate with each other through the network. In this case, communication may also be carried out through the remote support center 18, and communication can also be carried out only between the users without being carried out through the operator of the remote support center 18.

The remote support center 18 is provided with an operator terminal 12 and a server 14. The remote support center 18 makes a voice call or information exchange between the mobile PC 16 (and wearable device 23) and the operator terminal 12. It is possible to carry out video distribution of a real-time image shot by the wearable device 23 (connected to the mobile PC 16) to the operator terminal 12, and it is also possible to carry out mutual transmission/reception of an image between the mobile PC 16 and the operator terminal 12. Further, it is also possible to transmit a text message from the operator terminal 12 to the mobile PC 16. For example, in the picking operation at the distribution warehouse, a place of a picking item is displayed on the wearable device 23, whereby hands-free picking can be realized.

The remote support typically includes, for example, the following functions:

(1) A voice call function of carrying out an interactive voice call between the mobile PC 16 and the operator terminal 12.

(2) A live image distribution function of carrying out video distribution of a real-time image shot by the wearable device 23 to the operator terminal 12 during a voice call.

(3) A function of carrying out transmission/reception of a still image between the mobile PC 16 and the operator terminal 12 during a voice call (The mobile PC 16 transmits a shot still image or a capture image being video-distributed to the operator terminal 12. The operator terminal 12 edits the received image by writing characters or pictures, and transmits the edited image to the mobile PC 16. The still image received by the mobile PC 16 is stored in a folder in the mobile PC 16, and can be browsed.).

(4) A screen sharing function of displaying the entire desk-top screen of the operator terminal 12 or a window of an arbitrary application program on the wearable device 23 during a voice call.

(5) A text message transmitting function of transmitting a text message from the operator terminal 12 to the mobile PC 16.

The server 14 carries out processing for remote support in place of or in cooperation with the operator terminal 12, and is provided with a processor (CPU) 28, ROM 30, RAM 32, and a storage device 34 constituted of a hard disk drive (HDD) or solid-state drive (SSD), and interface 36. The operator terminal 12 may be made to have all the functions of the server 14, and the server 14 may be omitted.

[Operator Terminal 12]

FIG. 2 is a block diagram showing an exemplary structure of the operator terminal 12. The operator terminal 12 is constituted of a desktop PC, notebook PC or the like.

The operator issues an instruction to the user having the mobile PC 16 by a conversation or an image while confirming the situation of the workplace on the basis of a real-time image by using the operator terminal 12. The operator can write pictures or characters to the image file received from the mobile PC 16 by using the operator terminal 12 to edit the image file, transmit the edited image file to the mobile PC 16, and store the edited image file into the operator terminal 12.

The operator terminal 12 is provided with a system controller 42 including a processor. A main memory 44, a BIOS-ROM 50, a storage device 52 constituted of HDD or SSD, an audio codec 54, a graphics controller 62, a touch panel 70, a DSP (registered trade mark) connector 72, a wireless LAN device 74, a Bluetooth device 76, a wired LAN device 78, a PCI Express (registered trade mark) card controller 80, a memory card controller 82, an embedded controller/keyboard controller (EC/KBC) 84, and the like are connected to the system controller 42.

The system controller 42 executes various programs to be loaded from the storage, device 52 into the main memory 44. These programs include an operating system (OS) 46, and back-end application program 48 for remote support. The system controller 42 also executes the Basic Input/Output System (BIOS) stored in the BIOS-ROM 50 which is a nonvolatile memory. The BIOS is a system program for hardware control.

The audio codec 54 converts a digital audio signal which is an object to be reproduced into an analog audio signal, and supplies the converted analog audio signal to headphones 58 or a speaker 60. Further, the audio codec 54 converts an analog audio signal input thereto from a microphone 56 into a digital signal. The microphone 56 and the headphones 58 may be provided singly, and may also be provided in an integrated manner as an intercom.

The graphics controller 62 controls a liquid crystal display (LCD) 64 to be used as a display monitor of the operator terminal 12, The touch panel. 70 is overlaid on the screen of the LCD 64, and is configured in such a manner as to allow a handwriting input operation to be carried out on the screen of the LCD 64 by means of a touch-pen or the like. An HDMI (registered trade mark) controller 66 is also connected to the graphics controller 62. The HDMI controller 66 is connected to an HDMI connector 68 for connection to an external display device.

The wireless LAN device 74 executes wireless LAN communication of the IEEE802.11 standard for the purpose of connection to the network 22. The Bluetooth device 76 executes wireless communication of the Bluetooth standard for the purpose of connection to an external device. The wired-LAN device 78 executes wired LAN communication of the IEEE802.3 standard for the purpose of connection to the network 22. As described above, the connection between the operator terminal 12 and the network 22 may be made by wireless communication or may be made by wired communication.

The PCI Express card controller 80 carries out communication of the PCI Express standard between the operator terminal 12 and an external device. The memory card controller 82 writes data into a storage medium, for example, a memory card such as an SD (Secure Digital) card (registered trade mark), and reads data from the memory card.

The EC/KBC 84 is a power management controller, and is realized as a one-chip microcomputer incorporating therein also a keyboard controller which controls a keyboard 88. The EC/KBS 84 has a function of powering on or powering off the operator terminal 12 according to an operation of a power switch 86. Control of the power-on and power-off is executed by cooperation between the EC/KBC 84 and a power circuit 90. Even while the operator terminal 12 is in the power-off state, the EC/KBC 84 operates by power from a battery 92 or an AC adaptor 94. The power circuit 90 uses the power from the battery 92 or from the AC adaptor 94 (to be connected as an external electric power supply) to generate the power to be supplied to each component.

[Wearable Device 23]

Figure 3:
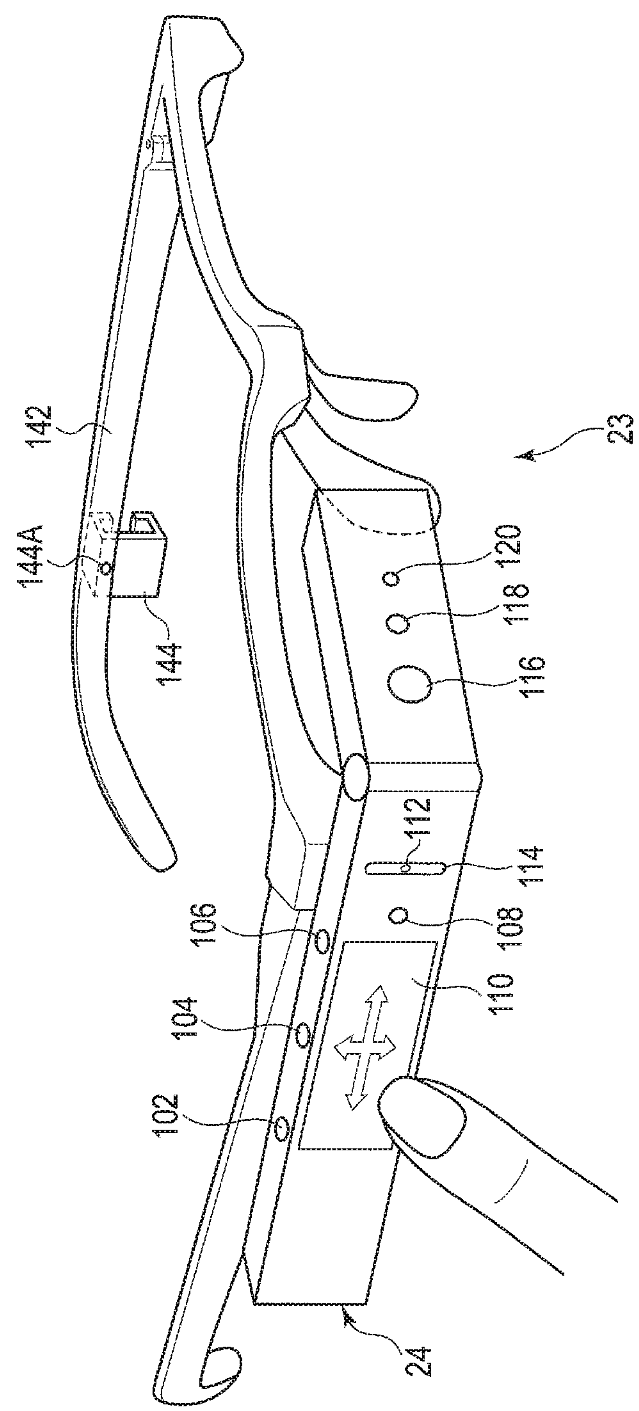
FIG. 3 is a view showing an example of an external appearance of a wearable device 23 to be connected to a mobile PC 16 in FIG. 1.

FIG. 3 shows an example of an external appearance of the wearable device 23 to be connected to the mobile PC 16. The wearable device 23 is provided with an eyeglass frame 142 and a wearable device main body 24. The eyeglass frame 142 may have a shape obtained by removing lenses from general eyeglasses and is worn on the face of the user. The eyeglass frame 142 may have a structure to which eyeglasses can be attached. When the user habitually uses eyeglasses at all times, lenses of degrees identical to the habitually used eyeglasses may be attached to the eyeglass frame 142.

The eyeglass frame 142 is provided with mounting brackets 144 on both the right temple and the left temple thereof. The wearable device main body 24 is attached to and detached from one of the mounting brackets 144 on the right or left temple. In FIG. 3, the mounting bracket 144 on the temple at the right side of the user is hidden behind the wearable device main body 24, and hence is not shown. As described above, the wearable device main body 24 is provided with a display device 124 (shown in FIG. 4). The display device 124 is configured in such a way as to be viewed by one eye. Therefore, the mounting brackets 144 are provided on both the right temple and the left temple so that the wearable device main body 24 can be attached to the mounting bracket on the dominant eye side. The wearable device main body 24 need not be detachably attached to the eyeglass frame 142 by means of the mounting bracket 144. The wearable devices 23 for the right and left eyes in which the wearable device main bodies 24 are respectively fixed to the eyeglass frames 142 on the right left frames may be prepared. Furthermore, the wearable device main body 24 may not be attached to the eyeglass frame 142, but may be attached to the head of the user by using a helmet or a goggle.

An engaging piece 128 (shown in FIG. 4) of the wearable device main body 24 is forced between a upper frame and a lower frame of the mounting bracket 144, whereby the wearable device main body 24 is attached to the eyeglass frame 142. When the wearable device main body 24 is to be detached from the eyeglass frame 142, the wearable device main body 24 is plucked out of the mounting bracket 144.

In a state where the wearable device main body 24 is attached to the mounting bracket 144, the engaging piece 128 is somewhat movable backwardly and forwardly in the mounting bracket 144. Accordingly, the wearable device main body 24 is adjustable in the front-back direction so that the user's eye can be brought to a focus on the display device 124. Furthermore, the mounting bracket 144 is rotatable around an axis 144A perpendicular to the temple. After the wearable device main body 24 is attached to the eyeglass frame 142, the wearable device main body 24 is adjustable in the vertical direction so that the display device 124 can be positioned on the user's line of sight. Moreover, the rotational angle of the mounting bracket 144 is about 90 degrees and, by largely rotating the mounting bracket 144 in the upward direction, the wearable device main body 24 can be flapped up from the eyeglass frame 142. Thereby, even when it is difficult to watch the real thing because the field of view is obstructed by the wearable device main body 24 or even when the wearable device main body 24 interferes with surrounding objects in a small space, it is possible to temporarily divert/restore the wearable device main body 24 from/to the field of view of the user without detaching/reattaching the entire wearable device 23 from/to the face of the user.

[Wearable Device Main Body 24]

The wearable device main body 24 is constituted of a side part to be along the temple of the eyeglass frame 142, and a front part to be positioned on the line of sight of one eyeball of the user. The angle which the front part forms with the side part is adjustable.

As shown in FIG. 3, on the outside surface of the front part, a camera 116, a light 118, and a camera LED 120 are provided. The light 118 is an auxiliary lighting fixture emitting light at the time of shooting a dark object. The camera LED 120 is turned on at the time of shooting a photograph or a video to thereby cause the objective person to be photographed to recognize that he or she is to be photographed.

On the top surface of the side part of the wearable device main body 24 attached to the right side temple, a first button 102, a second button 104, and a third button 106 are provided. When the dominant eye of the user is the left eye, the wearable device main body 24 is attached to the left side temple. The top and the bottom of the wearable device main body 24 are reversed according to whether the wearable main body 24 is attached to the right side temple or the left side temple. Therefore, the first button 102, the second button 104, and the third button 106 may be provided on both the top surface and the undersurface of the side part.

On the outside surface of the side part, a touch pad 110, a fourth button 108, a microphone 112, and an illuminance sensor 114 are provided. The touch pad 110 and the fourth button 108 can be operated by a forefinger. When the wearable device main body 24 is attached to the right side temple, the buttons 102, 104, and 106 are arranged at positions at which the buttons 102, 104, and 106 can be operated by a forefinger, a middle finger, and a third finger, respectively. A touch surface of the touch pad 110 is provided with a polygonal plate 100 with a thickness of several millimeters. Examples of a polygon may include a square, a rectangle, a square with round corners, and a rectangle with round corners. The touch pad 110 is configured such that the finger is moved upwardly, downwardly, rightward, and leftward along four sides of the plate 100, Upon detection of upward, downward, rightward, or leftward movement of the finger, the touch pad. 110 inputs a command. In this description, the command implies an executive instruction to execute specific processing to be issued to the wearable device main body 24. Operation procedures for the first to fourth buttons 102, 104, 106, and 108, and the touch pad 110 are determined in advance by the application program.

For example, when the third button 106 is pressed once, item selection/item execution is carried out, when the third button 106 is pressed for a long time, a list of started application programs is displayed, when the second button 104 is pressed once, the screen returns to the home screen, when the second button 104 is pressed for a long time, a menu of quick settings is displayed, and when the first button 102 is pressed once, cancellation (operation identical to the operation of the Esc key of the keyboard) of an operation is executed.

Regarding the operation of the touch pad 110, for example, when the touch pad 110 is dragged up, the cursor is moved up, when the touch pad 110 is dragged down, the cursor is moved down, when the touch pad 110 is flicked forward (to the front of the head), the left icon is selected (continuously scrolled), when the touch pad 110 is flicked backward (to the back of the head), the right icon is selected (continuously scrolled), when the touch pad 110 is dragged forward, the left icon is selected (items are scrolled one by one), and when the touch pad 110 is dragged backward, the right icon is selected (items are scrolled one by one).

The first button 102 is arranged at such a position as to be operated by a forefinger, the second button 104 at a position by a middle finger, the third button 106 at a position by a third finger, and the fourth button 108 at a position by a little finger. The reason why the fourth button 108 is provided not on the top surface of the side part, but on the outside surface of the side part in FIG. 3 is that there is space restriction. The fourth button 108 may also be provided on the top surface of the side part in the same manner as the first to third buttons 102, 104, and 106. The illuminance sensor 114 detects the illuminance of the surrounding area in order to automatically adjust the brightness of the display device.

Figure 4:
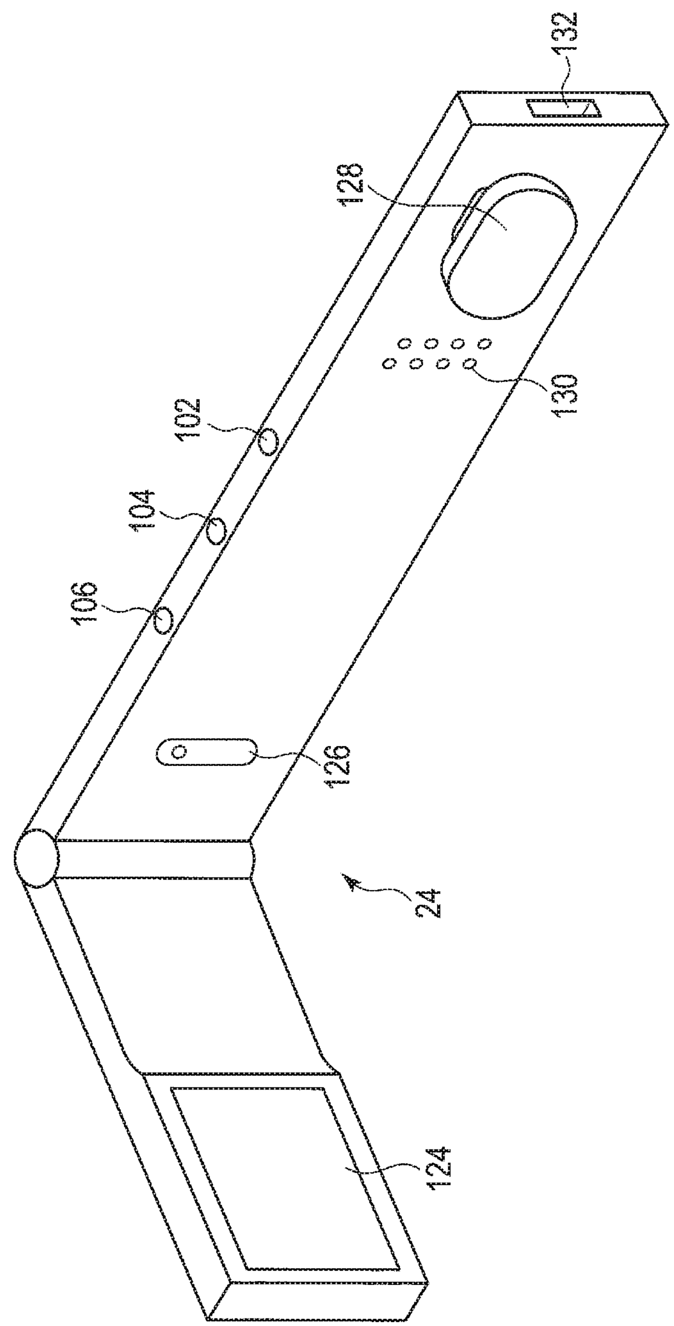
FIG. 4 is a view showing an example of an external appearance of a wearable device main body 24.

FIG. 4 shows an example of an external appearance of the back side of the wearable device main body 24. On the inner side of the front part, a display device 124 constituted of an LCD is provided. On the inner side of the side part, a microphone 126, a speaker 130, and an engaging piece 128 are provided. The microphone 126 is provided at a front position or the side part, and the speaker 130 and the engaging piece 128 are provided at a rear position of the side part. Headphones may be used in place of the speaker 130. In this case, the microphone and the headphones may also be provided in an integrated manner as an intercom in the same manner as the operator terminal 12.

FIG. 5 shows an example of connection between the mobile PC 16 and the wearable device main body 24. At a rear position of the side part, a receptacle 132 into which a plug 146A at one end of a cable 146 conforming to the USB type-C (registered trade mark) standard is to be inserted is provided. The receptacle 132 and the plug 146A may be generally called a connector. A plug 146B at the other end of the USB type-C cable 146 is inserted into a receptacle 207 conforming to the USB type-C standard provided on an upper end face of the mobile PC 16. The receptacle 207 and the plug 146B may be generally called a connector. As described above, the wearable device main body 24 is connected to the mobile PC 16 through the USB type-C cable 146, and image signals and the like are transmitted from/to the wearable device main body 24 to/from the mobile PC 16 through the USB type-C cable 146. The wearable device main body 24 may also be connected to the mobile PC 16 by means of wireless communication such as a wireless LAN, Bluetooth, and the like.

In the embodiment, the wearable device main body 24 is not provided with a battery or a DC terminal serving as a drive power supply, and the drive power is supplied from the mobile PC 16 to the wearable device main body 24 through the USB type-C cable 146. However, the wearable device main body 24 may also be provided with a drive power supply.

Figure 6:
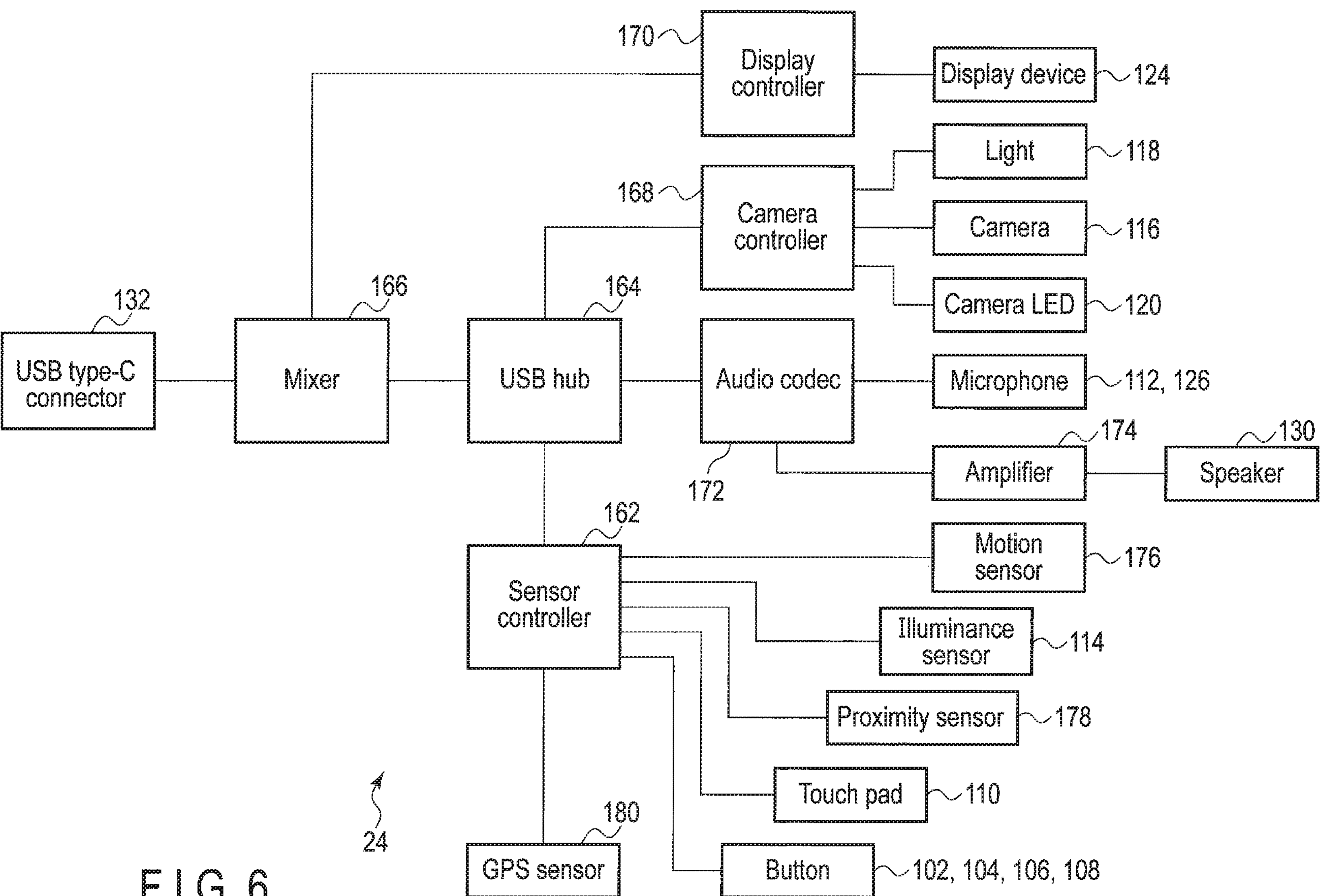
FIG. 6 is a block diagram showing an exemplary structure of the wearable device main body 24.

FIG. 6 is a block diagram showing an exemplary structure of the wearable device main body 24. The USB type-C connector (receptacle) 132 is connected to a mixer 166. A display controller 170 and a USB hub 164 are respectively connected to a first terminal and a second terminal of the mixer 166. The display device 124 is connected to the display controller 170. A camera controller 168, an audio codec 172, and a sensor controller 162 are connected to the USB hub 164. The camera 116, the light 118, and the camera LED 120 are connected to the camera controller 16. Audio signals from the microphones 112 and 126 are input to the audio codec 172, and an audio signal from the audio codec 172 is input to the speaker 130 through an amplifier 174.

A motion sensor (for example, an acceleration sensor, a geomagnetism sensor, a gravitation sensor, a gyroscopic sensor, etc.) 176, the illuminance sensor 114, a proximity sensor 178, the touch pad 110, the first to fourth buttons 102, 104, 106, and 108, and a GPS sensor 180 are connected to die sensor controller 162. The sensor controller 162 processes detection signals from the motion sensor 176, the illuminance sensor 114, the proximity sensor 178, the touch pad 110, the first to fourth buttons 102, 104, 106 and 108, and the GPS sensor 180, and supplies a command to the mobile PC 16. Although not shown in FIG. 4, the motion sensor 176 and the proximity sensor 178 are arranged inside the wearable device main body 24. The motion sensor 176 detects a motion, a direction, a posture and the like of the wearable device main body 24. The proximity sensor 178 detects attachment of the wearable device 23 on the basis of approach of a face, a finger and the like of the user thereto.

[Mobile PC 16]

FIG. 7 shows an example of an external appearance of the mobile PC (mobile edge computing device) 16. The mobile PC 16 is a small-sized. PC that can be held by one hand, and has a small size and a light weight, i.e., a width thereof is about 10 cm or less, a height thereof is about 18 cm or less, a thickness thereof is about 2 cm, and a weight thereof is about 300 g. Accordingly, the mobile PC 16 can be held in a pocket of the work clothing, a holster to be attached to a belt, or a shoulder case, and is wearable. Although the mobile PC 16 incorporates therein semiconductor chips such as a CPU, a semiconductor memory and the like, and storage devices such as a Solid State Drive (SSD) and the like, the mobile PC 16 is not provided with a display device and a hardware keyboard for input of characters.

On the front surface of the mobile PC 16, five buttons 202 constituted of an up button 202*a*, a right button 202*b*, a down button 202*c*, a left button 202*d*, and a decision button 202*e* (also called a center button or an enter button) are arranged, and a fingerprint sensor 204 is arranged below the five buttons 202. The mobile PC 16 is not provided with a hardware keyboard for input of characters, and a password (also called a PIN) cannot be input. Therefore, the fingerprint sensor 204 is used for user authentication at the time of login of the mobile PC 16. The five buttons 202 can input a command.

User authentication at the time of login may be carried out by allocating numeric characters to the buttons 202*a* to 202*d* of the five buttons 202, and by inputting a password using the five buttons 202. In this case, the fingerprint sensor 204 can be omitted. Numeric characters are allocated to the four buttons 202*a* to 202*d* other than the decision button 202*e*, and the number of the numeric characters is only four. Thus, there is a possibility of numeric characters input in a random manner being coincident with the password. However, by making the digit number of the password large, it is possible to make the probability that the numeric characters input in a random manner will be coincident with the password low. Authentication by the five buttons 202 may be enabled in also the mobile PC 16 provided with the fingerprint sensor 204. Although one mobile PC 16 may be shared among a plurality of users, it is not possible to cope with such a case by only the fingerprint authentication.

The operations identical to those of the buttons 102, 104, 106 and 108, and the touch pad 110 of the wearable device main body 24 can also be applied to the five buttons 202. The user cannot watch the state where the buttons 102, 104, 106 and 108, and the touch pad 110 of the wearable device main body 24 are being operated. Therefore, it may be necessary for a user to become accustomed to carrying out an intended operation depending on the user. Further, the buttons 102, 104, 106 and 108 and the touch pad 110 are small in size, and thus they may be difficult to operate. In the embodiment, the five buttons 202 of the mobile PC 16 can also be operated in the same manner as the buttons 102, 104, 106 and 108 and the touch pad 110, and hence the above-mentioned difficulty can be dispelled. The operation procedures of the five buttons 202 are determined in advance by the application program.

For example, when the decision button 202*e* is pressed once, item selection/item execution is carried out (corresponding to a pressing of the third button 106 in the wearable device main body 24), when the decision button 202*e* is pressed for a long time, ending or cancellation of an operation is carried out (corresponding to a pressing of the first button 102 in the wearable device main body 24), when the up button 202*a* is pressed once, the cursor is moved upward (corresponding to an upward drag on the touch pad 110 in the wearable device main body 24), when the up button 202*a* is pressed for a long time, a list of started application programs is displayed (corresponding to a pressing of the third button 106 for a long time in the wearable device main body 24), when the down button 202*c* is pressed once, the cursor is moved downward (corresponding to a downward drag on the touch pad 110 in the wearable device main body 24), when the down button 202*c* is pressed for a long time, a menu of quick settings is displayed (corresponding to a pressing of the second button 104 for a long time in the wearable device main body 24), when the left button 202*d* is pressed once, the right icon is selected (corresponding to a backward drag/flick on the touch pad 110 in the wearable device main body 24), and when the right button 202*b* is pressed once, the left icon is selected (corresponding to a forward drag/flick on the touch pad 110 in the wearable device main body 24).

On the upper side face of the mobile PC 16, a USB 3.0 connector (receptacle) 206, the USB type-C connector (receptacle) 207, and an audio jack 208 are provided.

On one side face (a side face on the left side when viewed from the front) of the mobile PC 16, a memory card slot 218 for a memory card is provided. The memory card includes, for example, an SD card (registered trade mark), a micro SD card (registered trade mark) card, and the like.

On the other side face (a side face on the right side when viewed from the front) of the mobile PC 16, a slot 210 for Kensington Lock (registered trade mark), a power switch 212, a power LED 213, a DC IN/battery LED 214, a DC terminal 216, and ventilation holes 222 for cooling are provided. The power LED 213 is arranged around the power switch 212, and turned on during the period of power-on of the mobile PC 16. The DC IN/battery LED 214 indicates the state of the mobile PC 16 such as whether or not the battery is being charged, and the remaining battery level. Although the mobile PC 16 can be driven by the battery, the mobile PC 16 can also be driven in the state where the AC adaptor is connected to the DC terminal 216. Although not shown in FIG. 7, the back side of the mobile PC 16 is configured such that the battery can be replaced with a new one by a one-touch operation.

FIG. 8 is a block diagram showing an exemplary structure of the mobile PC 16. The mobile PC 16 can carry out video distribution of an image shot by the wearable device main body 24 to the operator terminal 12, and enables browse of the image received from the operator terminal 12. For this reason, the mobile PC 16 is provided with a camera function and a viewer function. The camera function is a function of shooting a photograph or a video by means of the camera 116 of the wearable device main body 24. The shot photograph and video are stored in a camera folder (not shown in FIG. 8) in the mobile PC 16, and can be browsed by the viewer function. The viewer function is a function of enabling browse of a file stored in the camera folder. The types of the files include still images, moving images, PDF files, photographs and videos shot by the camera function, images received from the operator terminal 12, images transmitted to the operator terminal 12, and files stored in a user folder (not shown in FIG. 8) in the mobile PC 16.

The mobile PC 16 is provided with a system controller 302. The system controller 302 is constituted of a processor (CPU) and a controller/hub (not shown in FIG. 8). A main memory 308, the power LED 213, the DC IN/battery LED 214, and a USB controller 322 are connected to the processor of the system controller 302. A flash memory 326, a memory card controller 328, a storage device 330 constituted of an HDD or an SSD, a USB switching device 324, an audio codec 334, a 3G/LTE/GPS device 336, the fingerprint sensor 204, the USB 3.0 connector 206, a Bluetooth/wireless LAN device 340, and an EC/KBC 344 are connected to the controller/hub of the system controller 302.

The system controller 302 executes various programs to be loaded from the storage device 330 into the main memory 308. These programs include an OS 316, and a front-end application program 314 for remote support.

The audio coder 334 converts a digital audio signal which is an object (to be reproduced) into an analog audio signal, and supplies the converted analog audio signal to the audio jack 208. Further, the audio codec 334 converts an analog audio signal input from the audio jack 208 into a digital signal.

The memory card controller 328 accesses to a memory card such as an SD card to be inserted into the memory card slot 218, and controls read/write of data from/to the SD card.

The USB controller 322 carries out control of transmission/reception of data to/from the USB type-C cable 146 (shown in FIG. 5) connected to the USB type-C connector 207 or a USB 3.0 cable (not shown) connected to the USB 3.0 connector 206.

Although not shown, a port extension adaptor including ports or connectors according to several interfaces can be connected also to the USB type-C connector 207, and an interface which is not provided in the mobile PC 16, such as an HDMI or the like, can be used.

The Bluetooth/wireless LAN device 340 executes wireless communication conforming to the Bluetooth/IEEE802.11 standard for the purpose of connection to the network 22. The connection to the network 22 may not depend on wireless communication, and may depend on wired LAN communication conforming to the IEEE802.3 standard.

The fingerprint sensor 204 is used for fingerprint authentication at the time of startup of the mobile PC 16.

A sub-processor 346, the power switch 212, and the five buttons 202 are connected to the E/KBC 344. The EC/KBC

344 has a function of turning on or turning off the power to the mobile PC 16 according to the operation of the power switch 212. The control of power-on and power-off is executed by cooperative operation of the EC/KBC 344 and the power circuit 350, Even during a power-off period of the mobile PC 16, the EC/KBC 344 operates by the power from a battery 352 or an AC adaptor 358 (connected as an external power supply). The power circuit 350 uses the power from the battery 352 or the AC adaptor 358 to thereby generate power to be supplied to each component of the mobile PC 16. The power circuit 350 includes a voltage regulator module 356. The voltage regulator module 356 is connected to the processor in the system controller 302.

Although the mobile PC 16 is constituted as a body separate from the wearable device main body 24, the mobile PC 16 may be incorporated into the wearable device main body 24, and both of them may also be integrated into one body.

[Method of Starting Mobile PC 16]

As described above, in the remote support system, the mobile PC 16 is supposed to be used at a workplace together with a specific device, for example, the wearable device 23. However, the mobile PC 16 can be freely carried because the mobile PC 16 is small in size and light in weight. If a user detaches the mobile PC 16 from the specific device, takes out the mobile PC 16 from the workplace, and connects a keyboard and a display device to the mobile PC 16 at home or the like, the mobile PC 16 can be used as a personal computer in an unauthorized manner. In this case, confidential data stored in the mobile PC 16 may be leaked.

The embodiment provides a starting method for preventing such an unauthorized usage. In the embodiment, whether the usage environment of the mobile PC 16 is a predetermined environment is determined based on whether the mobile PC 16 is connected to the specific device or devices). When the mobile PC 16 is determined to be connected to the specific device (or devices), starting of the mobile PC 16 is enabled, and when the mobile PC 16 is determined not to be connected to the specific device (or devices), starting of the mobile PC 16 is disabled. Here, starting of the mobile PC means activation of the mobile PC. In this manner, authentication regarding a connected device (or devices) is required for starting the mobile PC 16, whereby the unauthorized usage outside the predetermined environment is prevented.

FIG. 9 is a flowchart illustrating an example of processing of the system controller 302 regarding starting of the mobile PC 16. In step S102, the system controller 302 detects power-on by an operation of the power switch 212. In step S104, the system controller 302 starts (activates) the BIOS, when power-on is detected. In step S106, the system controller 302 checks a device or devices connected to the mobile PC 16 and acquires identification information of the connected device (or devices), when the BIOS is started. If a set of devices (a plurality of devices) is connected to the mobile PC 16, items of identification information (a plurality of identification information) of the set of devices are acquired. The identification information includes a type of device (for example, a wearable device, a display device, or a keyboard), device-specific information (serial number), and the like. Note that in a case where the same serial number is not issued even when the type of device is different, acquisition of only the serial number is sufficient and the type of device information may not be acquired. When acquiring both the type of device and the device-specific information, the type of device information may be acquired as a part of the serial number or may be separately acquired from the serial number.

In step S108, the system controller 302 compares the acquired identification information of the connected device (or devices) with identification information of a connectable device (or devices) registered in the mobile PC 16. Since the connectable device (or devices) which should be connected to the mobile PC 16 in a predetermined usage environment is determined in advance, identification information of the connectable device (or devices) is registered in advance into the mobile PC 16. The registered identification information of the connectable device is called specified identification information, and the connectable device (or devices) of which identification information is registered is called a specified device (or devices). A connectable device table in which the specified identification information is registered may be stored into the flash memory 326, the storage device 330, or the like. In step S112, the system controller 302 determines whether the mobile PC 16 is used in the predetermined usage environment, based on the acquired identification information of the connected device (or devices) and the specified (registered) identification information of the connectable device (or devices).

Specifically, in step S112, the system controller 302 determines whether the specified identification information is included in the acquired identification information of the connected device (or devices). If the number of the specified identification information is one, in step S112, it is determined whether the specified identification information is matched with any of the acquired identification information of the connected device (or devices). If the number of the specified identification information is two or more (i.e., if items of specified identification information of a set of specified devices are registered), in step S112, it is determined whether all the items of the specified identification information is included in the acquired identification information (i.e., items of the acquired identification information of a set of connected devices). If the specified identification information is included in (or matched with) the acquired identification information (yes in step S112), the system controller 302 starts (activates) OS in step S122. If at least one of the items of the specified identification information is not included in (or not matched with) the acquired identification information, the system controller 302 does not start the OS. The system controller 302 performs an error display using the power LED 213 in step S114, and then terminates the processing.

The mobile PC 16 is not provided with a display device. The OS is not started at the stage of step S114. Therefore, even if the mobile PC 16 is provided with the display device, the error display by screen display cannot be performed. The error display in step S114 is performed using the power LED 213. In the power LED 213, an emission color and a blinking cycle are controllably variable. For example, the power LED 213 can be continuously turned on and off by changing the blinking cycle. By turning on the power LED 213 with a specific emission color in a specific blinking state, the error display in step S114 can be performed.

When the OS is started, the system controller 302 performs a user authentication in step S124. As described above, the user authentication may be the fingerprint authentication using the fingerprint sensor 204 or may be the password authentication using the five buttons 202. In step S126, the system controller 302 determines whether the result of the user authentication is a success. When the user authentication has succeeded, the system controller 302 continues starting of the OS in step S128.

When the user authentication failed, the system controller 302 determines whether the number of authentication failures has reached a predetermined number of times in step S132. The predetermined number of times may be, for example, three times. When the number of authentication failures has not reached the predetermined number of times, the operation of the system controller 302 returns to step S124 and the system controller 302 performs the user authentication again. When the number of authentication failures has reached the predetermined number of times, the system controller 302 performs an error display using the power LED 213 in step S134, and then terminates the processing.

As a result, even if the mobile PC 16 is taken out from the workplace and connected to a keyboard or a display device at home, the mobile PC 16 is not started, and therefore the unauthorized usage is prevented. Note that, in the above description, both the type of device and the serial number are compared as the identification information with the registered information. However, only the serial number may be used for determination as the identification information. On the contrary, when it is sufficient to start the mobile PC 16 if the mobile PC 16 is connected to a predetermined type of device, the serial number may not be included in the identification information, and determination may be made using only the type of device.

[Device Registration]

Figure 10:
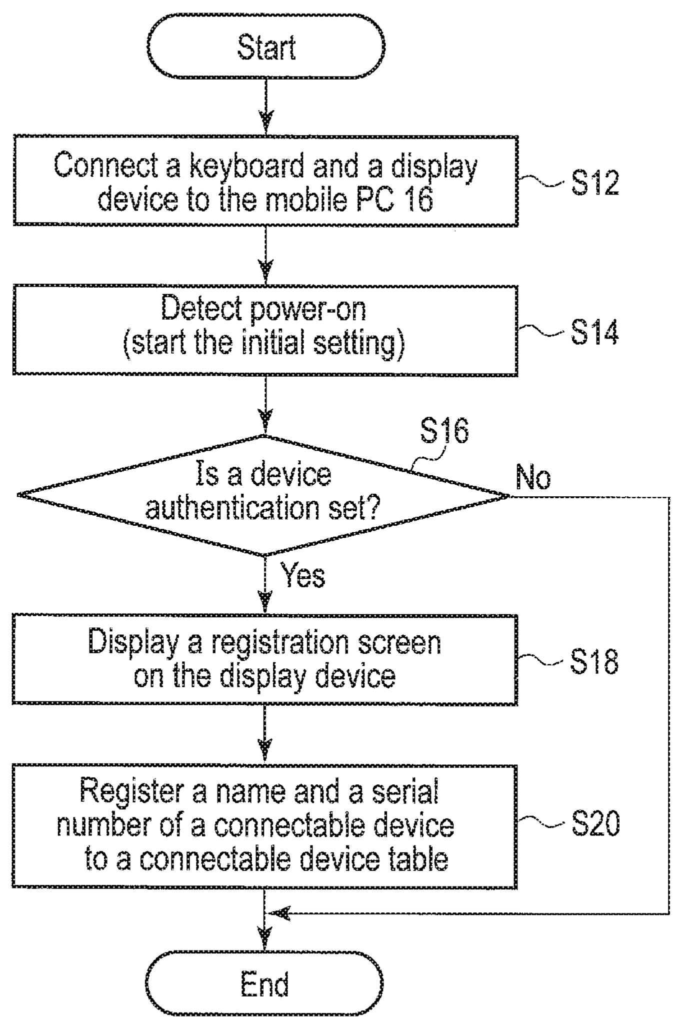
FIG. 10 is a flowchart illustrating an example of registration processing of the connectable device.

FIG. 10 is a flowchart illustrating an example of registration processing of the connectable device. The registration processing is performed at the initial setting in which the mobile PC 16 is started for the first time. In order to register the identification information of the connectable device, a keyboard, a mouse, and a display device are necessary. Therefore, in step S12, the user connects a keyboard (or a mouse) and a display device to the mobile PC 16 which has never been powered on. The keyboard and the mouse are connected no the mobile PC 16 via a USB cable or wireless communication of the Bluetooth standard. The display device is often connected to an external video device via an HDMI cable, but the mobile PC 16, which is an external video device, does not include an HDMI connector. Therefore, a port expansion adapter including a wired LAN connector, a USB 3.0 connector, an HDMI connector, an RGB connector, and the like is prepared. The port expansion adapter is connected to the USB type-C connector 207 of the mobile PC 16, and a video signal is supplied from the mobile PC 16 to the display device via the HDMI cable connected to the port expansion adapter.

The system controller 302 determines whether the mobile PC 16 is powered on. In step S14, the system controller 302 detects the first power-on of the mobile PC 16 and starts the BIOS. When the BIOS is started, the system controller 302 starts the initial setting. A screen for setting various types of information is displayed, and information regarding the authentication is set on the screen. Information concerning whether the user authentication is performed with a fingerprint and/or a password is set, and the fingerprint and the password are registered when performed, or information of the presence or absence of authentication regarding the connectable device is set.

When the authentication regarding the connectable device is set, the system controller 302 displays a registration screen on the display device in step S18. The registration screen is a screen for setting a name and a serial number of a connectable device which will be connected to the mobile PC 16 in the predetermined usage environment.

In step S20, when the user inputs the name and the serial number of a connectable device in a predetermined entry field on the registration screen, the system controller 302 registers the input name and serial number of the connectable device into the connectable device table. The device name may be input with the keyboard or may be selected from a pull-down menu. The serial number may be input with the keyboard or may be input by scanning a bar code on which the serial number is printed. When a plurality of model numbers is included in one type of device, the model numbers may also be set. When the mobile PC 16 is connected to a plurality of wearable devices in a predetermined environment, a plurality of items of identification information of a plurality of connectable devices is registered.

When changing the usage environment of the mobile PC 16, the connectable device table needs to be updated. Registration change is performed after the mobile PC 16 is started in the predetermined environment. For example, when registration change is selected on the menu, a registration change screen is displayed. The registration change screen is the same as the registration screen, and the name and the serial number of the device (displayed on the screen) are changeable. Addition and deletion of devices are also possible. However, the registration change can be freely performed, unauthorized usage becomes possible. Therefore, the registration change may be made available only when login with an administrator ID is performed, instead of normal login with a user ID, when starting the mobile PC 16 in the predetermined environment. That is, administrator authority is required for the registration change, and ordinary users may not be able to change the registration.

In the case where a plurality of mobile PCs 16 is used in the same environment, the processing in FIG. 9 is performed for each of the plural of mobile PCs 16. In the case where a plurality of mobile PCs 16 shares the same connectable device table, the table may be copied among the plurality of mobile PCs 16.

[Another Example of Method of Starting Mobile PC 16]

FIG. 11 is a flowchart illustrating another example of the processing of the system controller 302 regarding starting of the mobile PC 16. In step S152, the system controller 302 detects power-on by an operation of the power switch 212. In step S154, the system controller 302 starts the OS, when power-on is detected. Although not illustrated, the BIOS is started before the OS is started. When the OS is started, in step S156, the system controller 302 checks a device or devices connected to the mobile PC 16 and acquires the identification information of the connected device (or devices).

In step S158, the system controller 302 compares the acquired identification information of the connected device (or devices) with specified identification information of a connectable device (or devices) registered in advance into the mobile PC 16. In step S162, the system controller 302 determines whether the specified identification information is included in the acquired identification information of the connected device (or devices). If the specified identification information is not included in the acquired identification information of the connected device (or device), the system controller 302 performs an error display using the power LED 213 in step S164, and then terminates the processing. Steps S152, S156, S158, S162, and S164 in FIG. 11 are the same as steps S102, S106, S108, S112, and S114 in FIG. 9.

When the specified identification information is included in the acquired identification information of the connected device (or devices), the system controller 302 performs the user authentication using the fingerprint sensor 204 or the five buttons 202 in step S172. In step S174, the system controller 302 determines whether the result of the user authentication is a success. When the user authentication has succeeded, the system controller 302 continues starting of the OS in step S176.

When the user authentication failed, the system controller 302 determines in step S180 whether the number of authentication failures has reached a predetermined number of times. When the number of authentication failures has not reached the predetermined number of times, the operation of the system controller 302 returns to step S172 and the system controller 302 performs the user authentication again. When the number of authentication failures has reached the predetermined number of times, the system controller 302 performs an error display using the power LED 213 in step S182, and then terminates the processing.

The unauthorized usage is also prevented by the starting method in FIG. 11. In the starting method illustrated in FIG. 9, the connected devices are checked in the BIOS, whereas in the starting method illustrated in FIG. 11, the connected devices are checked in the OS, which is different. However, other parts of processing are the same.

[Modification]

The above-described system is an example of the remote control system in which the mobile PC 16 not provided with a display device such as a display or an input device such as a keyboard or a mouse is connected to the wearable device 23 provided with a display device and an input device. Another system example using the mobile PC 16 will be described.

FIG. 12 illustrates an example of a video conference system including the mobile PC 16. The video conference system is configured such that a plurality of mobile PCs 16, each of which is connected with a display, a microphone, a speaker, a camera, and the like, are connected via a network. A display device 402 has an HDMI connector, but the mobile PC 16 does not have an HDMI connector, and thus a port expansion adapter 414 for expanding an interface is connected to the mobile PC 16. The port expansion adapter 414 includes a USB type-C cable to be connected to the USB type-C connector 207 of the mobile PC 16. The port expansion adapter 414 includes a wired LAN connector, a USB 3.0 connector, an HDMI connector, an RGB connector, and the like. The mobile PC 16 is connected to the display device 402 via the port expansion adapter 414 and an HDMI cable. The display device 402 includes a sensor for detecting a touch on the screen and may be an electronic whiteboard capable of receiving touch input or handwriting input.

The mobile PC 16 is connected to the network 22 in a wirelessly or wired manner, and communicates image signals and the like with other mobile PCs 16. A microphone 404 is connected to the audio lack 208 of the mobile PC 16. A speaker 406 and a camera 408 are connected to the USB 3.0 connector 206 of the mobile PC 16 via a USB hub 412.

In this way, a video conference system that enables a conference attendee to talk with a partner while displaying images such as a document of a conference material and a face of the partner on the display device 402 is realized using the mobile PC 16. Serial numbers of specific devices, such as the display device 402, the microphone 404, the speaker 406 and the camera 408, are registered in a connectable device table of the mobile PC 16. The mobile PC 16 is not started unless the mobile PC 16 is connected to these specific devices.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of starting an electronic device connectable to other devices, the method comprising:

detecting whether the electronic device is connected to one device among the other device, the one device being a different device from the electronic device;

detecting identification information of the one device in response to detecting that the electronic device is connected to the one device;

comparing the identification information with specified identification information of a specified device;

enabling loading of an OS (Operating System) and execution of the OS when the identification information and the specified identification information are matched; and disabling the loading and the execution when the identification information and the specified identification information are not matched.

2. The method according to claim 1, further comprising: notifying that disabled in response that the loading and the execution are disabled.

3. The method according to claim 2, wherein the electronic device does not include a display device, and the notifying further comprises notifying that the loading and the execution are disabled using a light-emitting diode with a variable color or a variable blinking cycle.

4. The method according to claim 1, further comprising: performing user authentication in response that the loading and the execution are enabled.

5. The method according to claim 1, wherein the electronic device is able to execute a BIOS (Basic Input Output System), the detecting is implemented by the BIOS, and the method further comprising:

performing user authentication by the OS in response that the loading and the execution are enabled.

6. An electronic device connectable to other devices, the electronic device comprising:

a storage device;

a main memory; and a controller that detects whether the electronic device is connected to one device among the other devices, detects identification information of the one device in response to detecting that the electronic device is connected to the one device, compares the identification information with specified identification information of a specified device, enables loading of an OS (Operating System) from the storage device into the main memory and execution of the OS when the identification information and the specified identification information are matched, and disables the loading and the execution when the identification information and the specified identification information are not matched, the one device being a different device from the electronic device.

7. The electronic device according to claim 6, wherein, in response that the controller disables the loading and the execution, the controller notifies that the loading and the execution are disabled.

8. The electronic device according to claim 7, wherein the electronic device does not include a display device, and the controller notifies that the loading and the execution are disabled using a light-emitting diode with a variable color or a variable blinking cycle.

9. The electronic device according to claim 6, wherein, the controller performs user authentication in response that the loading and the execution are enabled.

10. The electronic device according to claim 6, wherein the electronic device is able to execute a BIOS (Basic Input Output System)

detecting whether the electronic device is connected to the one device and detecting the identification information of the one device are implemented by the BIOS, and the controller performs user authentication by the OS in response that the loading and the execution are enabled.

11. An electronic device connectable to other devices, the electronic device comprising:

a storage device;

a main memory; and a controller that detects whether the electronic device is connected to a set of devices among the other devices, detects items of identification information of the set of devices in response to detecting that the electronic device is connected to the set of devices, compares the items of the identification information with items of specified identification information of a set of specified devices among the other devices, enables loading of an OS (Operating System) from the storage device into the main memory and execution of the OS when all the items of the specified identification information are included in the items of the identification information, and disables the loading and the execution when at least one of the items of the specified identification information is not included in the items of the identification information, the set of devices being different devices from the electronic device.

* * * * *